United States Patent [19]

Chaput

[11] Patent Number: 5,738,925
[45] Date of Patent: Apr. 14, 1998

[54] BALLISTIC ARMOR HAVING A FLEXIBLE LOAD DISTRIBUTION SYSTEM

[75] Inventor: Armand Joseph Chaput, Fort Worth, Tex.

[73] Assignee: Lockheed Martin Corporation, Fort Worth, Tex.

[21] Appl. No.: 629,808

[22] Filed: Apr. 10, 1996

[51] Int. Cl.$^6$ .................................................. F41H 1/02
[52] U.S. Cl. ......................... 428/101; 2/2.5; 89/36.01; 89/36.02; 428/156; 428/161; 428/173; 428/174; 428/178; 428/911
[58] Field of Search ........................... 428/101, 911, 428/156, 161, 173, 174, 178; 89/36.01, 36.02; 2/2.5

[56] References Cited

U.S. PATENT DOCUMENTS

| 2,373,726 | 4/1945 | Watts | 428/911 |
|---|---|---|---|
| 2,768,919 | 10/1956 | Bjorksten et al. | 428/51 |
| 3,523,057 | 8/1970 | Buck | 428/156 |
| 3,577,836 | 5/1971 | Tamura | 2/2.5 |
| 3,705,558 | 12/1972 | McDougal et al. | 109/84 |
| 3,867,239 | 2/1975 | Alesi | 428/911 |
| 4,179,979 | 12/1979 | Cook et al. | 428/911 |
| 4,905,320 | 3/1990 | Squyers, Jr. | 2/22 |
| 4,945,814 | 8/1990 | Huet | 428/911 |
| 5,087,516 | 2/1992 | Groves | 428/323 |
| 5,110,661 | 5/1992 | Groves | 428/178 |
| 5,134,725 | 8/1992 | Yeshurun et al. | 2/2.5 |
| 5,200,256 | 4/1993 | Dunbar | 428/212 |
| 5,364,679 | 11/1994 | Groves | 428/76 |

OTHER PUBLICATIONS

"Stopping Power" Article, two pages.
"Armor Goes Hi-Tech" Article, ME Magazine, Jun. 1986, pp. 30-33.
"Ceramic BodyGuards" Art., Advanced Materials & Processes Inc., Metal Progress Sep. 1987, pp. 69-72.
"Ballistic Systems With Spectra® Composites", Article, pp. 1-8.
"Life-Gard" by Point Blank, Brochure, 4 pages.
"The Outlook For Advanced Armor Materials" Article, 22nd International SAMPE Technical Conference, Nov. 6-8, 1990, 4 pages (2 pages per page).
High-Performance Organic Fibers, Fabrics, and Composites for Soft and Hard Armor Applications, 23rd International SAMPE Technical Conference, Oct. 21-24, 1991, 6 pages (2 pages per page).

*Primary Examiner*—Nasser Ahmad
*Attorney, Agent, or Firm*—James E. Bradley

[57] ABSTRACT

A flexible protective armor is provided with a very hard microstructure and a flexible macrostructure for flexurally deforming along smooth curves when impacted by a ballistic projectile, and then rebounding after the impact. The flexible protective armor includes an outward layer of hard geometric shapes, preferably spheres, which are firmly mounted to an outward side of a flexible membrane. The flexible membrane is preferably a ballistic fabric which is formed of a sixty degree weave of ballistic fibers. The spheres have mounting portions and side engagement portions. The mounting portions of the spheres are firmly bonded to the flexible membrane by a rigid adhesive, with the spheres tightly packed to mechanically interlock the side engagement portions of adjacent ones of the spheres for rotating relative to on another, free of the rigid adhesive. The kinetic energy of a fast moving projectile is absorbed upon impact with the flexible protective armor by curving of the layer of spheres and the flexible membrane, tensioning the ballistic fibers of the flexible membrane within the elastic range of the ballistic fibers so that the flexible protective armor will rebound after impact. A fiber reinforced pliable material is disposed within the interstitial spaces between the spheres and the flexible membrane to absorb the energy of the spheres when the flexible protective armor is rebounding after impact. A flexible, impact resistant polyurethane coating extends across on outward side of the layer of spheres.

13 Claims, 6 Drawing Sheets

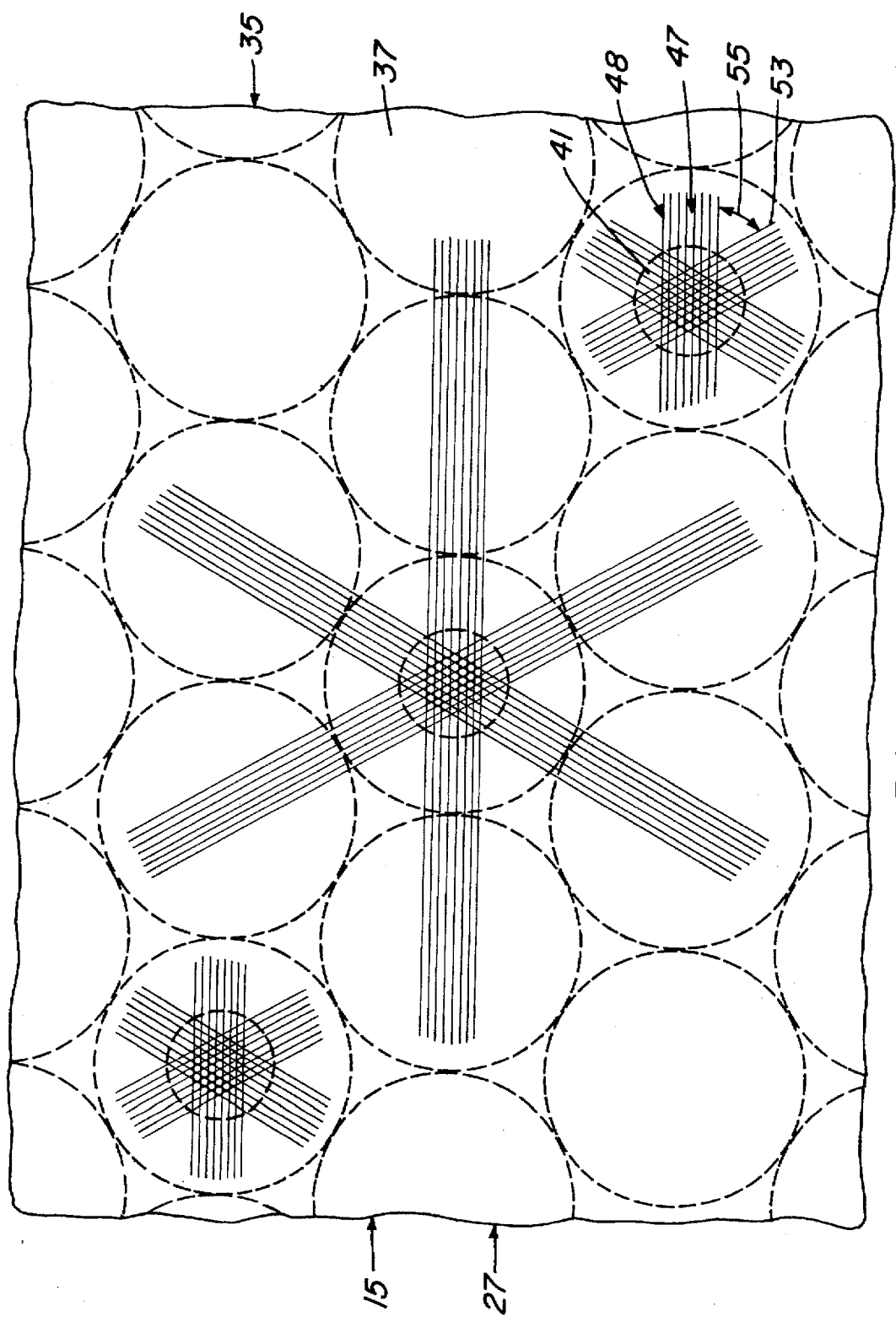

5,738,925

BALLISTIC ARMOR HAVING A FLEXIBLE LOAD DISTRIBUTION SYSTEM

BACKGROUND OF THE INVENTION

1. Technical Field

The present invention relates in general to ballistic armor, an in particular to a protective flexible ballistic armor which can sustain impacts of ballistic projectiles without being damaged.

2. Description of the Related Art

The prior art includes several primary types of ballistic armor. One type of prior art ballistic armor is provided by rigid armor components having large enough masses to absorb the impacts of ballistic projectiles. The rigid armor components of large masses have included large exterior plates made of hard materials, the plates having much larger masses than the masses of the ballistic projectiles. The large plates have been provided by very hard steel plates, and in some cases by large ceramic bricks. Hard ceramic shapes have also been used to absorb the kinetic energy of incoming projectiles by fracturing of the ceramic shapes upon impact of the projectiles.

Another type of prior art ballistic armor is a flexible type of armor. Flexible types of ballistic armor have included woven fabrics of ballistic fibers, such as Kevlar™, a trademark of E. I. du Pont de Nemours and Company, and Spectra®, a trademark of Allied-Signal, Inc. Kevlar™ is an aramid fiber and Spectra® is an ultra high molecular weight polyethylene fiber. Typically, multiple layers of the woven fabric are provided and the kinetic energy of an incoming projectile is absorbed by stretching and tearing of the fabric.

Some types of prior art armor have included ceramic spheres enclosed within ballistic fabric. The ceramic spheres have either been loose within pockets of the ballistic fabric, or completely bonded together and bonded to the ballistic fabric. When a prior art armor having loose ceramic spheres within woven fabric is impacted by an incoming projectile, it tends to deform inward with a sharp fold in the ballistic fabric. The type of ballistic armor having spheres which are glued together within ballistic fabric also tend to fold or crease upon impact and are damaged at the point of impact. The structural strength of components of these armors are typically exceeded upon impact of an incoming ballistic projectile so that the integrity of the armor is damaged at the point of impact of the projectile. The ballistic fabric is usually damaged.

SUMMARY OF THE INVENTION

A flexible protective armor is provided with a very hard microstructure and a flexible macrostructure for flexurally deforming along smooth curves when impacted by a ballistic projectile, and then rebounding after the impact. The flexible protective armor includes an outward layer of hard geometric shapes, preferably spheres, which are firmly mounted to an outward side of a flexible membrane. The flexible membrane is preferably a ballistic fabric which is formed of a sixty degree weave of ballistic fibers. The spheres have mounting portions and side engagement portions. The mounting portions of the spheres are firmly bonded to the flexible membrane by a rigid adhesive, with the spheres tightly packed to mechanically interlock the side engagement portions of adjacent ones of the spheres for rotating relative to on another, free of the rigid adhesive. The kinetic energy of a fast moving projectile is absorbed upon impact with the flexible protective armor by curving of the layer of spheres and the flexible membrane, tensioning the ballistic fibers of the flexible membrane within the elastic range of the ballistic fibers so that the flexible protective armor will rebound after impact. A fiber reinforced pliable material is disposed within the interstitial spaces between the spheres and the flexible membrane to absorb the energy of the spheres when the flexible protective armor is rebounding after impact. A flexible, impact resistant polyurethane coating extends across on outward side of the layer of spheres.

BRIEF DESCRIPTION OF THE DRAWINGS

FIG. 5 is a partial sectional view of a portion of the flexible protective armor, taken along section line 5—5 of FIG. 4;

DETAILED DESCRIPTION OF THE PREFERRED EMBODIMENT

Figure 1:
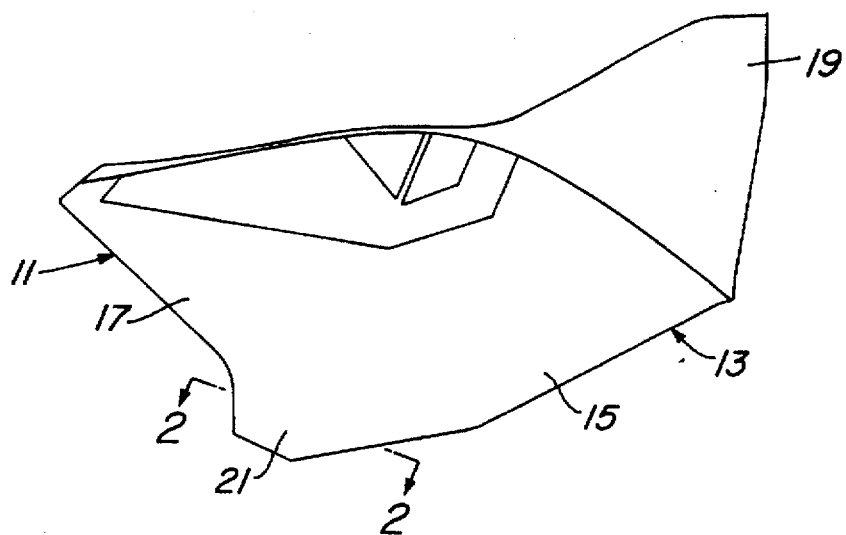
FIG. 1 is a perspective view of an aircraft having an outer skin which includes a flexible protective armor of the present invention.

FIG. 1 is a perspective view of aircraft 11 having an outer skin 13 which includes flexible protective armor 15 of the present invention. Fuselage 17 and wings 19, 21 are both protected by flexible protective armor 15 which prevents fast moving, incoming projectiles from damaging aircraft 11. Flexible protective armor 15 is designed to deform to absorb the kinetic energy of ballistic projectiles upon impact, and then rebound to its initial shape after impact, without being damaged by the impact.

Figure 2:
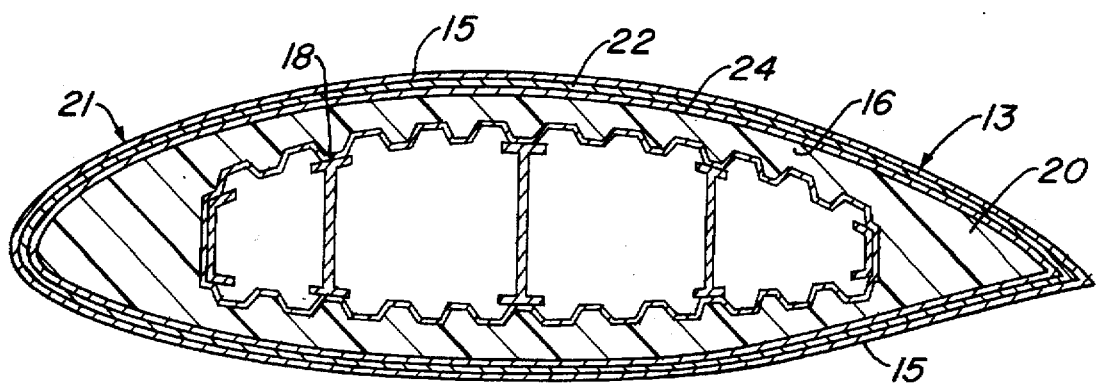
FIG. 2 is a sectional view of a wing of the aircraft, taken along section line 2—2 of FIG. 1.

FIG. 2 is a sectional view of wing 21 of aircraft 11, taken along section line 2—2 of FIG. 1. Wing 21 is provided with outer skin 13 and internal fuel tank 16. Outer skin 13 includes flexible protective armor 15. Inward of flexible protective armor 15 is layer of ballistic fabric 22 and then shape control layer 24. A pressure and fuel barrier 26 (shown in FIG. 3) extends inward of ballistic fabric 22, preferably formed on an outward side of shape control layer 24. Load carrying structure 18 and foam layer 20 extend within fuel tank 16. External air loads are transmitted through ballistic fabric layer 22 and foam layer 20, and then reacted by the internal load carrying structure 18.

Figure 3:
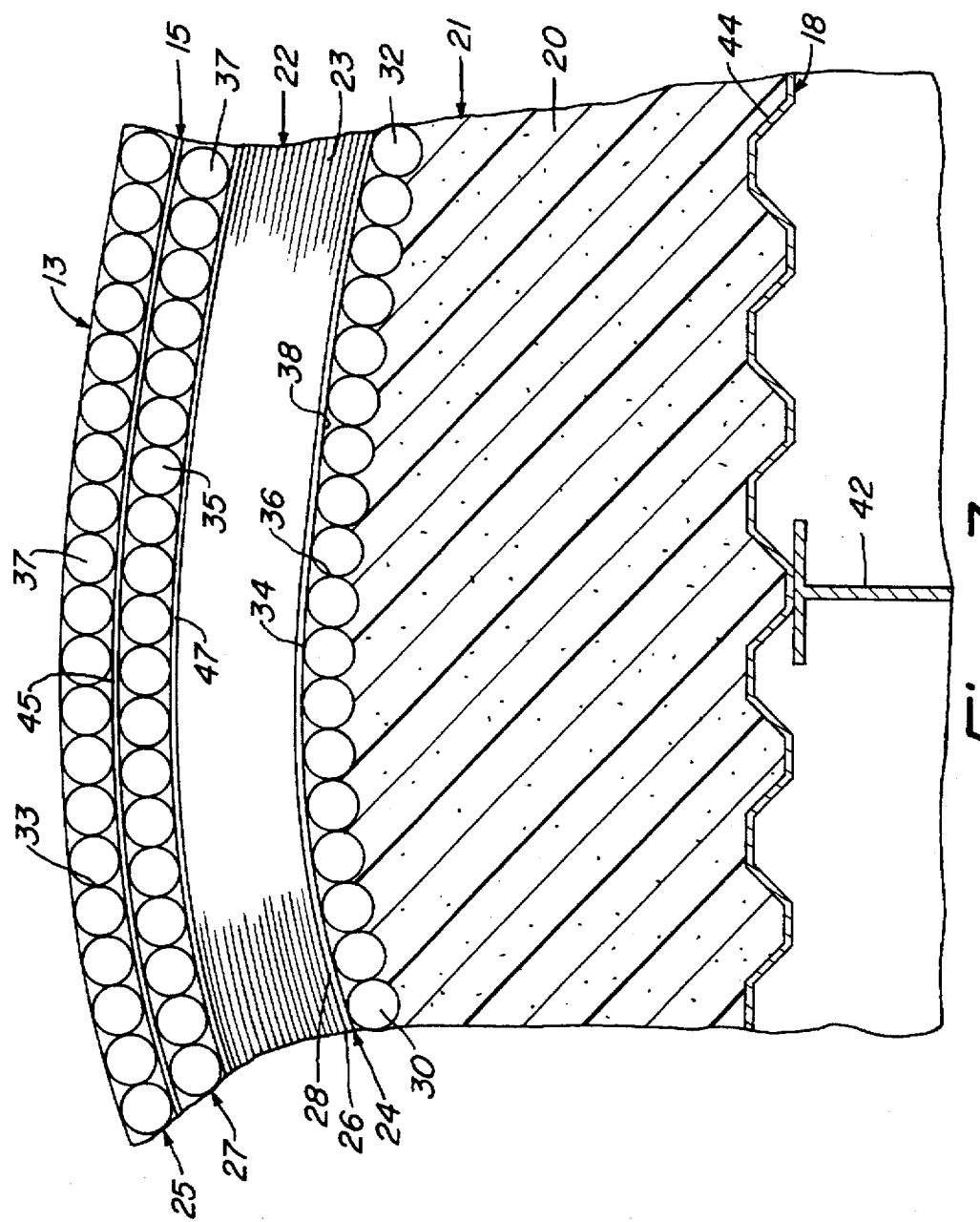
FIG. 3 is an enlarged view of a portion of the sectional view of the wing depicted in FIG. 2.

FIG. 3 is an enlarged view of a portion of the sectional view of wing 21 of FIG. 2. Flexible protective armor 15 is the outermost element of wing 21, and includes outer flexible armor layer 25 and inner flexible armor layer 27. Outer flexible armor layer 25 includes flexible membrane 45 and layer 33 of hard geometric shapes 37, with geometric shapes 37 of layer 33 being rigidly bonded to flexible membrane 45. Inner flexible armor layer 27 includes flexible membrane 47 and layer 35 of hard geometric shapes 37, with geometric shapes 37 of layer 35 being rigidly bonded to flexible membrane 47. Flexible armor 15 provides a flexible load distribution system which is a light-weight, flexible surface that protects the underlying layers of ballistic fabric 22 and foam 20 from penetration by incoming projectiles and fragments.

Ballistic fabric layer 22 is formed of multiple layers of high-strength ballistic fibers 23. Ballistic fibers 23 are preferably made of materials such as Kevlar™ and Spectra®. Ballistic fabric layer 22 will distribute and further absorb the ballistic impact energy of a projectile. Ballistic fabric layer 22 transmits ballistic impact loads through underlying layers to load carrying structure 18 of the airframe. Ballistic fabric layer 22 provides long load distribution paths for flexible protective armor 15.

Fuel barrier 26 is provided by either applying an impervious coating or impregnation to flexible membrane 28 of shape control layer 24 to seal fuel and pressure within fuel tank 16. Fuel barrier 26 is preferably formed of a pliant, elastomeric material.

Shape control layer 24 includes layer 30 of hard geometric shapes, preferably ceramic spheres 32, and a flexible membrane 28. Spheres 32 have mounting portions 34 and side mechanical engagement portions 36, and are preferably the same as geometric shapes 37, which are also preferably ceramic spheres. The mounting portions of spheres 32 are firmly attached to the inward side of flexible membrane 28 by a rigid adhesive, such as adhesive 43 (shown in FIG. 4). Layer 30 of spheres 32 is mounted to an inward surface 38 of flexible membrane 28 with spheres 32 in a tightly packed arrangement in which side engagement portions 36 are in edge-to-edge contact, which mechanically interlocks adjacent ones of spheres 32 by means of surface friction. The interstitial spaces between spheres 32 need not be filled with a viscoelastic material, such as fiber reinforced viscoelastic material 57 of flexible protective armor 15 (shown in FIG. 4). Membrane 28 is preferably one to three fabric layers of high-strength, high-modulus ballistic fibers 23 which are interwoven at 60 degrees, so that fibers 23 extend in three directions within a single plane of a fabric layer. Membrane 28 may be secured to ballistic fabric layer 22 by a flexible adhesive (not shown).

Shape control layer 24 controls the shape of the periphery of fuel tank 16 by restraining the outward deflection of flexible membrane 28 over a range of internal pressure levels within fuel tank 16. Outward deflection of flexible membrane 28 is restrained by the hard geometric shapes provided by spheres 32 being in edge-to-edge contact and firmly attached to interior surface 38 of flexible membrane 28. As flexible membrane 28 deflects outward under internal pressure loads of fuel tank 16, the ballistic fibers 23 of flexible membrane 28 will be placed under tension as adjacent ones of spheres 32 rotate relative to one another, inward of flexible membrane 28. Rotation of spheres 32 interacts with flexible membrane 28 to place reaction loads within flexible membrane 28, substantially parallel to inward surface 38, to place ballistic fibers 23 in tension. Flexible membrane 28 will deflect outward until the internal pressure loads of fuel tank 16 are balanced by the tensile loads within the high strength, high modulus of elasticity ballistic fibers 23 of flexible membrane 28.

Shape control layer 24 will provide shape control in only the outward direction since the hard geometric shapes provided by spheres 32 are located inside of flexible membrane 28 and flexible membrane 28 is placed in tension. Flexible membrane 28 will deflect inward to react ballistic load deflections. The geometric shape assumed by inward surface 38 of flexible membrane 28 will determine the exterior shape of skin 13 of aircraft 11. In other embodiments, a shape control layer may provide shape control of an interior surface by placing a layer of geometric shapes on the exterior surface of a flexible membrane.

FIGS. 2 and 3 show foam layer 20, located interiorly of shape control layer 24 and fuel barrier 26. Foam layer 20 is preferably formed of reticulated polyurethane safety foam which is porous for containing fuel. Foam layer 20 provides internal ballistic fire protection by internally distributing ballistic impact loads and their resulting hydrodynamic loads. Load carrying structure 18 comprises beam components 42 and corrugated sheet metal 44. Corrugated sheet metal 44 provides the shape of the inward surface of foam 20, and has perforations (not shown) extending therethrough so that fuel may pass through sheet metal 44 and both to and from foam 20 for distributing hydrodynamic loads.

Figure 4:
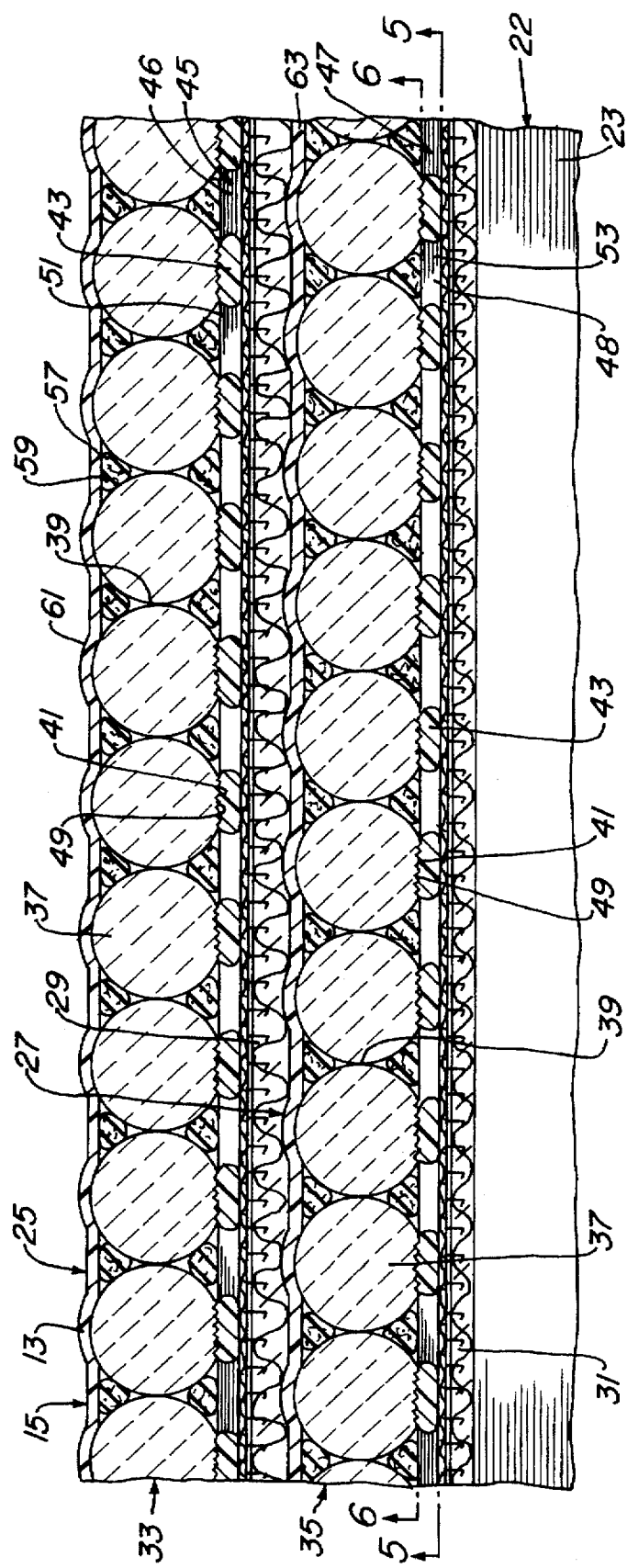
FIG. 4 is an enlarged view of a portion of the sectional view of the flexible protective armor of the wing depicted in FIG. 3.

FIG. 4 is a sectional view of a portion of skin 13 taken perpendicular to the outward surface of skin 13. In the preferred embodiment, flexible armor 15 includes a flexible outer armor layer 25 and inner armor layer 27. Slipping attachment means 29 and 31 extend between armor layers 25, 27, and between armor layer 27 and ballistic fabric layer 22, respectively. Slipping attachment means 29, 31 are preferably provided by velcro fasteners. Slipping attachment members 29, 31 will release during deformation of flexible armor layers 25, 27 and ballistic fabric layer 22 to allow slippage therebetween, then will reattach when layers 25, 27 and composite layer 22 rebound after impact.

Flexible protective armor 15 includes two single layers 33, 35 of hard geometric shapes 37, which are preferably spheres disposed in edge surface to edge surface contacts in a hexagonal close packed relationship. Spheres 37 preferably range in size from 20 thousandths (0.020) of an inch to 7 tenths (0.7) of an inch in diameter, and are formed of a hardened ceramic material, such as beryillia, which has a density of 108 thousandths (0.108) pounds per cubic inch.

Figure 6:
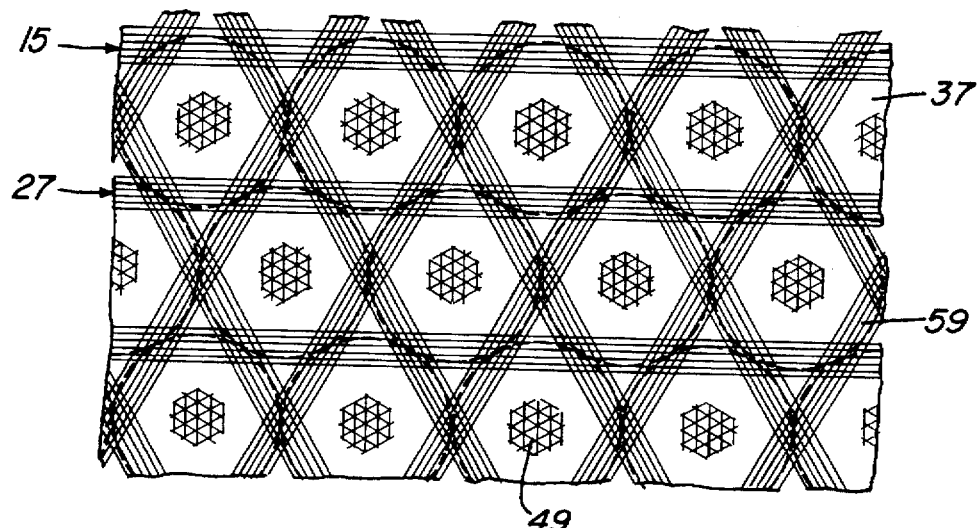
FIG. 6 is a sectional view of a portion of the flexible protective armor, taken along section line 6—6 of FIG. 4.

Geometric shapes 37 have side engagement portions 39 which are in surface to surface contact with the side surfaces of adjacent ones of shapes 37. Shapes 37 of layers 33, 35 further include mounting portions 41 which are bonded by a rigid, high strength adhesive 43 to flexible membranes 45, 47, respectively. Mounting portions 41 are preferably roughened surfaces provided by flattening and then cutting grooves 49 (see FIG. 6) into the inward end surface 41 of spheres 37. As shown in FIG. 6, grooves 49 are cut into spheres 37 in a ±60 degree pattern. Adhesive 43 is preferably provided by an epoxy or polyurethane based adhesive 43 which firmly bonds the hard geometric shapes 37 of layers 33, 35 to flexible membranes 45, 47, respectively, with engagement portions 39 in a frictional engagement. Spheres 37 are firmly bonded to membranes 45, 47 so they will not move relative to membrane 45, 47. The frictional engagement is provided by surface to surface contacts between mounting portions 39, which are not bonded together by adhesive 43. The frictional engagement mechanically interlocks hard geometric spheres 37 of each of layers 33, 35, which are arranged in the hexagonal close pack alignment, so that adjacent ones of spheres 37 may rotate relative to one another, free of rigid adhesive 43.

Flexible membranes 45, 47 are each provided by one to three layers 46, 48 of woven fabric of high strength ballistic fibers 51, 53, respectively, which are woven together at 60 degree angles to one another to extend in three directions within respective ones of the planes of layers 46, 48. Preferably Kevlar™ or Spectra® ballistic fibers are used. As shown in FIG. 4, flexible membrane 45 of flexible armor layer 25 is provided by outer weave 46 of ballistic fibers 51, and flexible membrane 47 of armor layer 27 is provided by inner weave 48 of ballistic fibers 53. Outer layer 33 of geometric shapes 37 is firmly attached to an outward side of flexible membrane 45. Inner layer 35 of geometric shapes 37 is firmly attached to an outward side of flexible membrane 47. The ballistic fibers 51, 53 of flexible membranes 45, 47 may be spaced apart or arranged in a more tightly packed arrangement, such as the tightly woven ballistic fabric 48 shown in FIG. 5.

FIG. 5 is a sectional view of a portion of flexible armor 15 taken along section line 5—5 of FIG. 4, and depicts inner woven fabric layer 48 of flexible membrane 47, as would be viewed when looking outward from slipping attachment member 31 (shown in FIG. 4) into inner armor layer 27. Only a portion of woven fabric layer 48 is shown in FIG. 5. Rigid adhesive 43 and pliable material 57 are not shown in FIG. 5. Woven fabric layer 48 of membrane 47 is preferably disposed in a pattern having an angle 55 which measures approximately 60 degrees between individual ballistic fibers 53. Woven fabric layer 46 of outer flexible membrane 45 (shown in FIG. 4) would preferably look the same as that depicted for membrane 47 in FIG. 5.

Individual ones of ballistic fibers 53 of woven ballistic fabric 48 are directionally oriented to extend in selected directions defined by the edge-to-edge pattern of shapes 37. The ones of ballistic fibers 53 which are bonded by high strength adhesive 43 (shown in FIG. 4) to mounting surfaces 41 of geometric shapes 37 provide primary load paths for absorbing out of plane loads from geometric shapes 37. Out of plane loads are herein defined to be loads which are not parallel to, or not within the plane of, the woven fabric layers 46, 48 of flexible membranes 45, 47.

Referring again to FIG. 4, a visco-elastic material provides pliable material 57 which is reinforced by ballistic fibers 59 and fills the interstitial spaces between hard geometric shapes 37. Preferably, long, unidirectional ballistic fibers 59 are intermixed with pliant material 57 for added strength. In other embodiments, shorter lengths of fibers may be used in place of fibers 59. Pliant material 57 will preferably flow some when placed under stress in addition to elastically deforming. Ballistic fiber 59 reinforced pliant material 57 is provided for absorbing the kinetic energy of spheres 37 as armor layers 25 and 27 are rebounding after impact. In the preferred embodiment, pliant material 57 is provided by RTV silicone. In other embodiments, elastomeric materials may be used, such as Show Goo®, available from Eclectic Products, Inc., of San Pedro, Calif.

FIG. 6 is a sectional view of inner layer 27 of flexible ballistic armor 15, taken along section line 6—6 of FIG. 4. Fiber 59 reinforced, pliant material 57 (pliant material 57 is not shown in FIG. 6 for clarity) extends in the interstitial spaces between spheres 37 with fibers 59. The ±60 degree pattern of grooves 49 formed in the mounting portions 41 of spheres 37 is also depicted. Three sets of grooves 49 are at 60 degree angles to one another. Each set of grooves 49 is at right angles to adjacent ones of the ballistic fiber 53 of fabric weave 48 (shown in FIG. 5) to enhance the adhesive bonding between spheres 37 and fibers 53.

Referring again to FIG. 4, polyurethane layers 61, 63 extend on top of layers 33, 35 of spheres 37, respectively. Polyurethane layers 61, 63 provide flexible armor layers 25, 27 with a low modulus, high impact resistant coating. Layers 61, 63 help retain pliant material 57 and shapes 37 within armor layers 25, 27, respectively, against outward forces generated when flexible armor 15 is rebounding from a ballistic impact. Layers 61, 63 provides wear resistant outer coatings to prevent loss of pliant material 57. Layer 63 also provides a surface to which slip attachment means 31 may be bonded.

Figure 7:
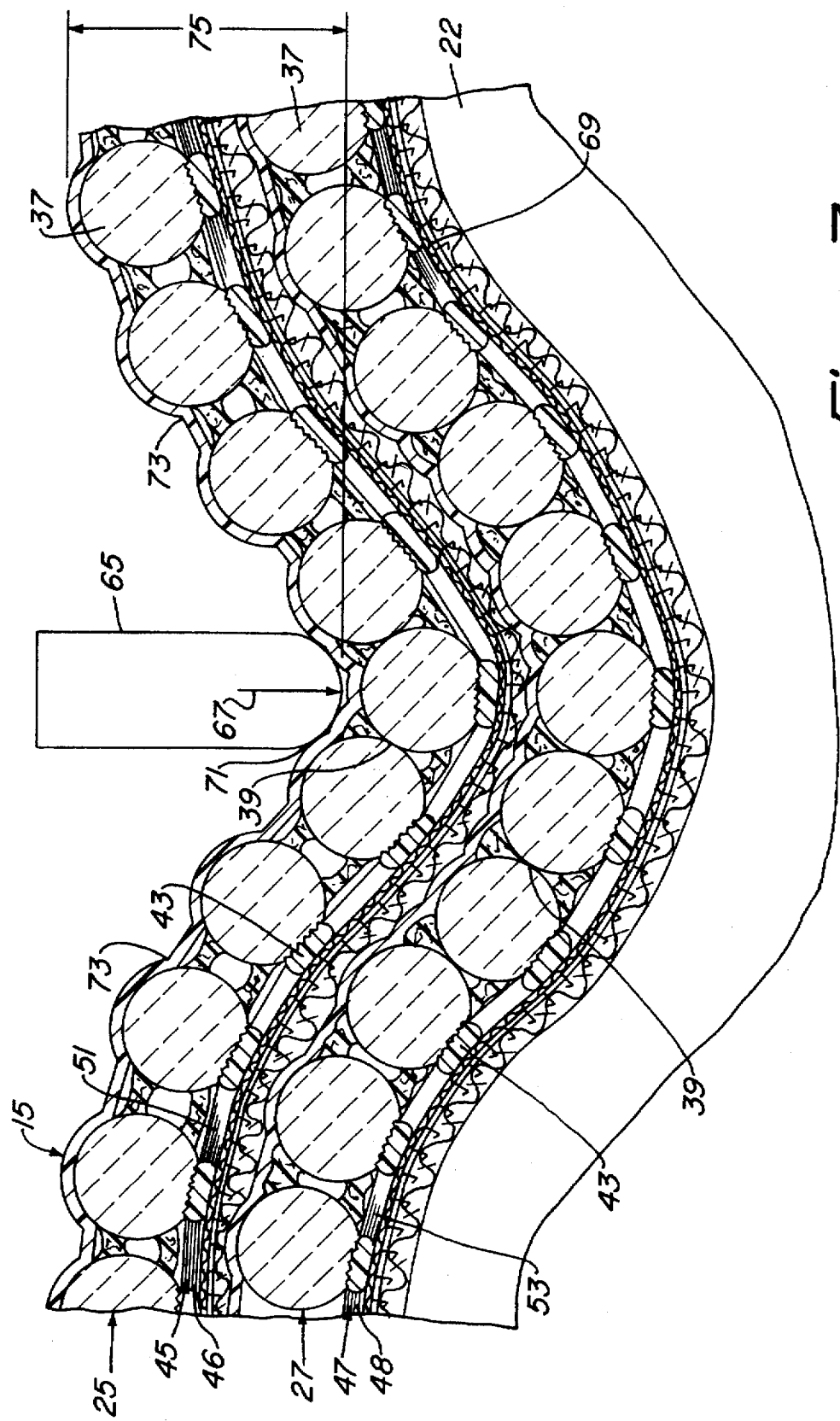
FIG. 7 is a sectional view of the portion of the flexible protective armor of FIG. 4, taken along the same sectioning plane as the view of FIG. 4, and depicts a ballistic projectile impacting the outer surface of the flexible protective armor.

FIG. 7 is a sectional view of a portion of flexible armor 15, with a projectile 65 impacting armor 15 with a velocity 67. According to the present invention, armor 15 will absorb the out of plane load of the impact of projectile 65 so that armor 15 and ballistic fabric layer 22 deform inward with a flexural loading along smoothly curved surfaces, such as inward surface 69 of armor layer 27, without any sharp bends or folds in armor layers 25, 27 or composite layer 22.

An out of plane load is herein defined as a load which is not parallel to or within the plane of woven ballistic fabric layers 46, 48 of flexible membranes 45, 47. Flexural loading is herein defined as a loading which is distributed so that armor layers 25, 27 will deform along smooth curves, such as the smoothly curved shape of the inward surface 69 of armor layer 27 shown in FIG. 7. Flexural loading of flexible armor layers 25, 27 will appear in a sectional profile to bend along smooth curves, much like flexural loading of a beam, rather than having a sharp bend or fold.

As geometric shapes 37 move as a result of an impact of a ballistic projectile, the frictional engagement between side mechanical engagement surfaces 39 of shapes 37 will cause adjacent ones of shapes 37 to rotate with respect to one another, distributing the load of impact over a larger region than that which the projectile actually impacts and stretching flexible membranes 45, 47. Stretching flexible membranes 45, 47 will transfer the load of impact into the plane of flexible membranes 45, 47, placing the interwoven fibers 51, 53 of flexible membranes 45, 47 in tension. Geometric shapes 37 are interlocked in layers 33, 35 so that adjacent ones of the geometric shapes 37 within layers 33, 35 will rotate along mechanical engagement portions 39, and transmit the out of plane load of the kinetic energy of projectile 65 into the plane of flexible membranes 45, 47. This provides for an even distribution of the forces. Spheres 37 in impact region 71 will rotate relative to one another. In peripheral region 73, which extends around impact region 71, spheres 37 may separate.

With large projectiles, flexible armor 15 of the preferred embodiment of the present invention may deform inward with a smoothly curved shape for a total deflection 75 of up to 12 to 15 inches. It should also be noted that the long load paths provided by ballistic fabric layer 22 are integrally formed in to the load carrying structure of the airframe of aircraft 11 so that high stresses will not result along the load attachment points between ballistic fabric layer 22 and load carrying portions of the airframe. Armor 15 will deform upon the impact of projectile 65 along smooth, controlled curves, preferably without exceeding the elastic tensile strengths of ballistic fibers 51, 53 of flexible membranes 45, 47, the compressive strength of hard geometric shapes 37 and the shear strength of adhesive 43. Thus, flexible protective armor 15 has a hard microstructure provided by geometric shapes 37, yet on a macrolevel, protective armor 15 is flexible. Preferably, after the impact of projectile 65 upon skin 13, projectile 65 will bounce off of outer skin 13, allowing skin 13 to return to its initial shape depicted in FIG. 4, without damage to flexible armor 15. High velocity projectiles typically encountered from conventional weapons will be deflected from skin 13 without damaging the components of aircraft 11, leaving flexible protective armor 15 intact and undamaged for absorbing the impact of later projectiles at the same points of prior impacts.

Referring to FIG. 4, a method of manufacturing flexible ballistic armor 15 is now discussed. First, each of the layers of armor layers 25, 27 are separately fabricated. Referring to flexible outer armor layer 25, a layer 33 of spheres 37 are preferably placed onto a plane, contained in a hexagonal close packed arrangement in which spheres 37 are in edge to edge contact. In other embodiments, a curved surface may be used rather than a plane, in which the curved surface is the same shape as the final exterior shape of armor 15, the exterior of aircraft 11 in the preferred embodiment. Fibers 59 are then placed in the interstitial spaces between spheres 37 of layer 33. Pliant material 57 is then injected into the interstitial spaces between spheres 33, and compressed between spheres 37 of layer 33. Pliant material 57 may be cured prior to forming mounting portions 41 into spheres 37. An abrasive wheel is then used to mechanically remove the tops of spheres 37 of layer 33, and grooves 49 are formed in a pattern, three sets of grooves 49 (shown for layer 35 in FIG. 5) at 60 degrees to one another. This provides mounting portions 41 of spheres 37.

Uncured adhesive 43 is then placed on mounting portions 41 of spheres 37. The woven fabric 46 of flexible membrane 45 is placed onto the uncured adhesive 43 disposed on mounting portions 41 in the alignment shown in FIG. 5 for armor layer 27. Woven fabric 45, having ballistic fibers 51 in the ±60 degree weave pattern, is aligned with grooves 49 in spheres 37 so that ballistic fibers 51 cross adjacent to mounting portions 41 at 90 degrees to grooves 49 (shown in FIG. 5 for armor layer 27). Pressure is then applied to push ballistic fibers 51 of woven fabric 46 inward into the uncured rigid adhesive 43 on mounting portions 41 and pliable material 57, respectively. Rigid adhesive 43 is then cured as pressure is applied to press flexible membrane 45 onto layer 33 of spheres 37. Polyurethane layer 61 is then applied to the outward side of layer 33 of spheres 37 and cured.

Referring to FIGS. 4 and 5, the above process is then repeated for inner armor layer 37. Pliable material 57 is placed in the interstitial spaced between layer 35 of spheres 37, with fibers 59 embedded in pliant material 57. Mounting portions 41 are formed into spheres 37 of layer 37, with grooves 49. Woven fabric 48 of ballistic fibers 53 are firmly attached by rigid adhesive 43 to mounting portions 41 of inner layer 35 of spheres 37, with weave 48 of ballistic fibers 53 aligned to longitudinally extend at 90 degrees to grooves 49. Pressure is then applied and rigid adhesive 43 is cured. Polyurethane layer 63 is then applied to the outward side of layer 35 of spheres 37 and cured.

Slipping attachment means 29 is adhesively bonded one side to flexible membrane 45 and on the other side to polyurethane layer 63. Slipping attachment means 31 is adhesively bonded on one side to flexible membrane 47 and on the other side to the exterior surface of underlying ballistic fabric layer 22. Inner armor layer 27 is pressed onto ballistic fabric layer 22, joined to ballistic fabric 22 by attachment means 31. Slipping attachment means 29 is pressed together to join flexible outer armor layer 25 to flexible inner armor layer 27.

Figure 8:
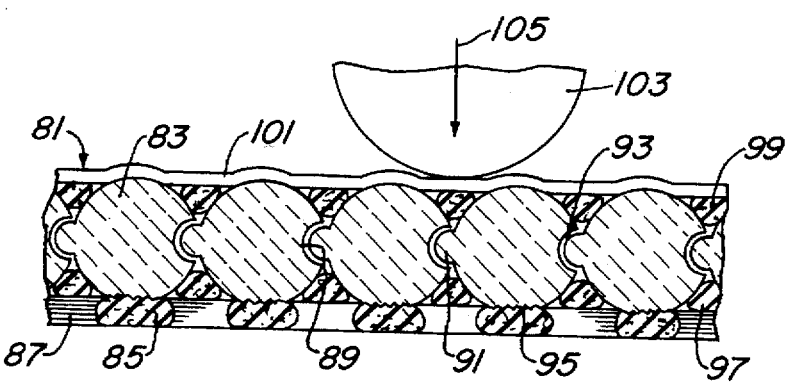
FIG. 8 is a sectional view schematically depicting a flexible protective armor of a first alternative embodiment of the present invention.

FIG. 8 is a sectional view which schematically depicts an alternative flexible armor 81 of the present invention. Alternative armor 81 includes a layer of hard geometric shapes 83 disposed in a single layer which is firmly bonded by rigid adhesive 85 to flexible membrane 87. Flexible membrane 87 is preferably provided by one to three layers of a ±60 degree woven fabric of ballistic fibers, as discussed above for the preferred embodiment. Geometric shapes 83 have sockets 89 and protuberances 91 which interlock to define mechanical engagement portions 93. Geometric shapes 83 further have mounting portions 95 along which rigid adhesive 85 firmly attaches shapes 83 to flexible membrane 87. Mounting portions 95 have roughened surfaces to enhance bonding of shapes 83 to flexible membrane 87. Fiber reinforced pliant material 97 is provided by a visco-elastic material which extends in the interstitial spaces between shapes 83 and protuberances 91, with lengths of ballistic fibers 99 preferably embedded within material 97. Polyurethane coating 101 extends across the outward side of the layer of shapes 83.

An incoming projectile 103 having a velocity 105 will impact flexible armor 81 with an out of plane load. The out of plane load of the impact will then be absorbed by alternative flexible armor 81 by flexible armor 81 deforming along smooth curves in flexural loading, such as that discussed above for flexible protective armor 15 of the preferred embodiment. Mechanical engagement portions 93 are free of adhesive and mechanically interlocked by surface friction in the tightly packed arrangement so that adjacent one of geometric shapes 83 may rotate relative to one another to distribute and transfer out of plane loads into in plane loads, placing flexible membrane 87 in tension.

Figure 9:
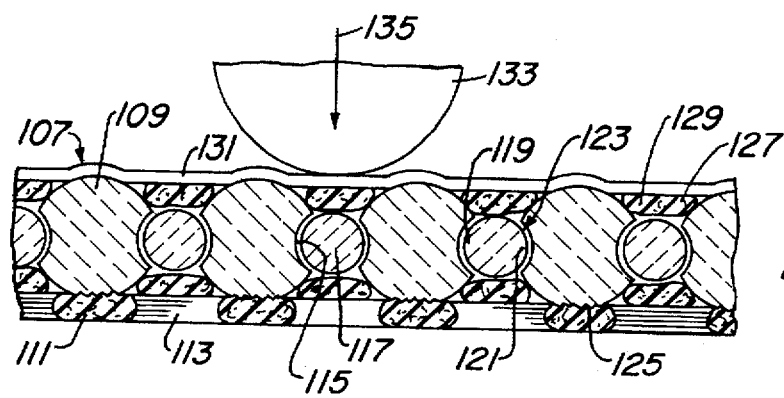
FIG. 9 is a sectional view schematically depicting a flexible protective armor of a second alternative embodiment of the present invention.

FIG. 9 is a sectional view which schematically depicts alternative flexible armor 107 of the present invention. Alternative flexible armor 107 includes a layer of hard geometric shapes 109 which are disposed in a single layer that is bonded by rigid adhesive 111 to flexible membrane 113. Flexible membrane 113 is preferably provided by one to three layers of a ±60 degree woven fabric of ballistic fibers, as discussed above for the preferred embodiment. Geometric shapes 109 are very hard spheres similar to geometric shapes 37 of FIG. 4. Geometric shapes 109 have sockets 115 into which interlocking shapes 117 extend with protuberances 119, 121. Protuberances 119, 121 extend into sockets 115 to define mechanical engagement portions 123 and mechanically interlock adjacent ones of shapes 109. Mechanical engagement portions 123 are free of rigid adhesive 111, and allow adjacent ones of geometric shapes 109 to rotate relative to one another. Rigid adhesive 111 firmly bonds geometric shapes 109 to flexible membrane 113 along mounting portions 125 so that mounting portions 125 are rigidly bonded and will not slip with respect to flexible membrane 113. In alternative flexible armor 107, fiber reinforced visco-elastic material 127 is provided for filling interstitial spaces within flexible armor 107. Lengths of ballistic fibers 129 are embedded within material 127 for strength. Polyurethane coating 131 extends along the outer sides of shapes 109.

An out of plane load of impact of projectile 133 approaching with velocity 135 will be distributed over a region larger than the actual area of contact and will be transferred into an in plane load, that is, a reaction load which is within or parallel to the plane of flexible membrane 113, placing flexible membrane 13 in tension. This occurs when interlocking shapes 117 are free of rigid adhesive 111 so that geometric shapes 109 may rotate relative to adjacent ones of shapes 109. Flexible armor 107 will deform along smooth curves with flexural loading to transmit the kinetic energy of impact of projectile 133 into tension within flexible membrane 113, preferably without exceeding the elastic limits of flexible membrane 113.

The embodiments of FIGS. 8 and 9 may be used for a shape control layer for controlling the spape of an outward surface by placing geometric shapes 83 and 109 inward of flexible membranes 87 and 113, respectively.

The present invention provides several advantages over prior art ballistic armor. Interlocking geometric shapes are provided which are rigidly bonded to and outwardly disposed from a flexible membrane. The geometric shapes are interlocked so that they are free to rotate relative to one another while they remain firmly attached to the flexible membrane. The geometric shapes will not slip relative to the flexible membrane. The interlocking geometric shapes provide a very hard microstructure which will deflect inward when impacted by a fast moving projectiles, with adjacent ones of the geometric shapes rotating relative to one another. Relative rotation between adjacent ones of the geometric shapes will transmit the out of plane loads from the impacts of the fast moving projectiles into tensile forces within the underlying flexible membrane.

On a macrolevel, the flexible ballistic armor of the present invention is flexible for nondestructively absorbing the impact of ballistic projectiles. The flexible protective armor will flexurally deform with a smooth curvature to absorb the impacts of the ballistic projectiles without exceeding the elastic strengths of the flexible membrane. The flexible armor will then rebound to its initial shape in an undamaged condition, with the projectiles separating from the flexible protective armor after the impacts. This type of flexible armor will not be damaged at the areas of impact so that it can sustain further impacts from ballistic projectiles without the integrity of the flexible outer armor being compromised.

While the invention has been shown in only several of its forms, it should be apparent to those skilled in the art that it is not so limited, but is susceptible to various changes without departing from the scope of the invention.

What is claimed is:

1. A flexible protective armor for protecting against impacts of fast moving projectiles, the flexible protective armor comprising:

a first flexible membrane having a 60 degree weave of ballistic fibers;

a first layer of hard spheres having mounting portions and mechanical engagement portions, the first flexible membrane and the first layer of spheres comprising a first armor layer;

adhesive fixedly bonding the first layer of the spheres to the flexible membrane, outward of the flexible membrane, with the mounting portions of the spheres being bonded to the ballistic fibers such that the spheres are tightly packed with the mechanical engagement portions of adjacent ones of the spheres in contact for rotating relative to one another, free of the adhesive;

a second armor layer having a second flexible membrane and a second layer of hard spheres, the second layer of spheres being rigidly bonded to one side of the second flexible membrane and adjacent ones of the spheres disposed in contact for rotating relative to one another;

a slipping attachment means for mounting the second armor layer to the first armor layer, with the second layer of spheres disposed outward of the first armor layer and the second flexible membrane; and wherein kinetic energy of the fast moving projectiles is absorbed by flexural bending of the layers of spheres and the flexible membranes, with a portion of the spheres rotating relative to adjacent spheres, stretching the ballistic fibers.

2. The flexible protective armor according to claim 1, wherein the slipping attachment means comprises a hook and loop fastener.

3. A flexible protective armor for protecting against impacts of fast moving projectiles, the flexible protective armor comprising:

a flexible membrane having a weave of ballistic fibers;

a plurality of hard spheres having engagement portions, the engagement portions of the spheres being in contact with the spheres; and each of the spheres being independently bonded to the membrane by a discrete adhesive portion which is spaced apart from adjacent adhesive portions such that the spheres are tightly packed and mechanically interlocked with the engagement portions of adjacent ones of the spheres allowing limited rotational movement relative to one another.

4. The flexible protective armor according to claim 3, further comprising:

a pliant material disposed in interstitial spaces between the spheres; and an impact resistant layer disposed on one side of the spheres, opposite the flexible membrane.

5. The flexible protective armor according to claim 3 wherein the engagement portion of each of the spheres comprises a portion of an exterior surface of each of the spheres.

6. The flexible protective armor according to claim 3 wherein the engagement portion of each of the spheres comprises a concave socket on each of the spheres and a protuberance between adjacent ones of the spheres for engaging each of the sockets.

7. The flexible protective armor according to claim 3 wherein the engagement portion of each of the spheres comprises a spherical protuberance on one side of each of the spheres and a concave socket on an opposite side of each of the spheres for receiving the protuberance of an adjacent one of the spheres.

8. A flexible protective armor for protecting against impacts of fast moving projectiles, the flexible protective armor comprising:

a layer of cushioning material on a first side;

a first layer of hard spheres located on one side of the layer of cushioning material;

a flexible first membrane having a weave of ballistic fibers bonded to the first layer of spheres opposite of the layer of cushioning material;

a layer of ballistic fibers located on an opposite side of the first membrane from the first layer of spheres;

a flexible second membrane having a weave of ballistic fibers located on an opposite side of the layer of ballistic fibers from the first membrane; and a second layer of hard spheres bonded to an opposite side of the second membrane from the layer of parallel ballistic fibers.

9. The flexible protective armor according to claim 8 wherein the spheres within each of the layers of spheres contact one another at a point on an exterior surface of the spheres.

10. The flexible protective armor according to claim 8, further comprising:

a flexible third membrane having a weave of ballistic fibers located on an opposite side of the second layer of spheres from the second membrane; and a third layer of spheres bonded to an opposite side of the third membrane from the second layer of spheres.

11. The flexible protective armor according to claim 8, further comprising an attachment layer connecting the third membrane to the second layer of spheres, the attachment layer having means for allowing portions of the second layer of spheres to detach from the third layer of spheres in the event of an impact of sufficient magnitude.

12. The flexible protective armor according to claim 11 wherein the attachment layer comprises hook and loop fasteners.

13. The flexible protective armor according to claim 8 wherein the spheres of each of the layers are independently bonded to their respective membranes.

* * * * *